(12) United States Patent
Wosnitza et al.

(10) Patent No.: US 8,763,466 B2
(45) Date of Patent: Jul. 1, 2014

(54) GAUGE PRESSURE SENSOR

(75) Inventors: Elmar Wosnitza, Freiburg (DE);
Michael Hugel, Lorrach (DE); Sergej Lopatin, Lorrach (DE); Thomas Uehlin, Schopfheim (DE); Olaf Textor, Lorrach (DE); Hansjorg Brock, Grenzach-Wyhlen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 13/637,768

(22) PCT Filed: Feb. 28, 2011

(86) PCT No.: PCT/EP2011/052911
§ 371 (c)(1),
(2), (4) Date: Sep. 27, 2012

(87) PCT Pub. No.: WO2011/124418
PCT Pub. Date: Oct. 13, 2011

(65) Prior Publication Data
US 2013/0019687 A1    Jan. 24, 2013

(30) Foreign Application Priority Data

Apr. 8, 2010  (DE) .......................... 10 2010 003 709
Apr. 8, 2010  (DE) .......................... 10 2010 003 710

(51) Int. Cl.
*G01L 7/00*  (2006.01)
*G01L 9/00*  (2006.01)

(52) U.S. Cl.
USPC .............................................. 73/700; 73/753

(58) Field of Classification Search
None
See application file for complete search history.

(56) References Cited

U.S. PATENT DOCUMENTS

| | | | | |
|---|---|---|---|---|
| 6,324,897 | B1* | 12/2001 | Schrenk et al. | ............... 73/31.05 |
| 7,882,726 | B2* | 2/2011 | Gupta et al. | ....................... 73/38 |
| 2013/0008256 | A1* | 1/2013 | Rossberg et al. | ................ 73/724 |
| 2013/0015864 | A1* | 1/2013 | Lopatin et al. | ................. 324/663 |

* cited by examiner

*Primary Examiner* — Lisa Caputo
*Assistant Examiner* — Jermaine Jenkins
(74) *Attorney, Agent, or Firm* — Bacon & Thomas, PLLC

(57) ABSTRACT

A gauge pressure sensor for determining the pressure of a medium by means of a housing and by means of a measuring element, which is positioned in the housing, wherein an outwards facing side of the measuring element is in contact with the medium and is exposed to the pressure, which is to be measured. A tube for a reference pressure is provided, which conducts ambient air to the measuring element, and by means of at least one dehumidifying chamber, positioned in the housing, for the collection of air moisture. The dehumidifying chamber contains a moisture adsorbing material or is primarily composed of a moisture adsorbing material, in that the moisture adsorbing material is at least, in sections, enclosed by a wall, which is composed of a first moisture permeable material, or is at least, in sections, free from a wall, and in that the reference pressure supply tube is at least, in sections, fabricated from a first or second moisture permeable material or in that the reference pressure supply tube has an aperture.

15 Claims, 6 Drawing Sheets

GAUGE PRESSURE SENSOR

TECHNICAL FIELD

The present invention relates to a gauge pressure sensor for determining the pressure of a medium relative to atmospheric pressure comprising a housing and a measuring element, which is positioned in the housing, wherein an outwards facing side of the measuring element is in contact with the medium and is exposed to the pressure, which is to be measured, and a tube for reference pressure, which conducts ambient air at atmospheric pressure to an inner side of the measuring element, and an analysis unit, which determines the pressure of the medium from a magnitude determined by means of the measuring element, and at least one dehumidifying chamber, positioned in the housing, for the collection of air moisture. Wherein, the medium whose pressure is to be determined is fluid or in gas form.

BACKGROUND DISCUSSION

In pressure sensor technology, absolute pressure sensors, differential pressure sensors and gauge pressure sensors are commonly known. Absolute pressure sensors determine the prevailing pressure in an absolute sense, i.e. relative to a vacuum, while differential pressure sensors determine the difference between two separate pressures. With gauge pressure sensors, the measured pressure is determined relative to a reference pressure supply, wherein the ambient, prevailing atmospheric pressure serves as this reference pressure supply. This sort of gauge pressure sensor normally comprises a closed measurement chamber with a pressure sensitive diaphragm, which seals the measurement chamber on one side. The pressure, which is to be measured, acts upon the outside surface of the sensing diaphragm. By way of example, the measurement chamber is connected to the surrounding environment via a vented tube through which the ambient air enters the measurement chamber so that the ambient pressure exists in the measurement chamber as well as on the inner surface of the sensing diaphragm. The sensing diaphragm bends, depending on the existing gauge pressure. This bending is converted into an electrical signal, by means of an electromechanical transducer, and this is used to determine the pressure of the medium relative to the reference pressure supply.

To produce the electrical signals, which mirror the degree of the bend of the sensing diaphragm, the sensing diaphragm is normally provided with a first electrode and the opposite surface of the measurement chamber is provided with a second electrode and a third electrode. The second electrode serves as a reference electrode and is so arranged so that its capacitance is only influenced by the temperature, humidity and other work environment specific parameters and not from the bending of the sensing diaphragm. The third electrode composes, along with the first electrode, a precision capacitor, which is especially sensitive to the bending of the sensing diaphragm. The capacitance of a capacitor composed in this way changes as a function of the bending of the sensing diaphragm, so that the capacitance of the gauge pressure is determinable.

A further group of commonly known gauge pressure sensors comprises a sensing diaphragm, on which strain sensitive elements such as strain sensitive films are arranged. The resistance of the strain sensitive films is dependent on the bending of the sensing diaphragm and so serves as a measurable quantity for the evaluation of the pressure.

A further group of commonly known gauge pressure sensors, from the prior art, comprises a flexural plate, whereon pressure sensitive elements are arranged. This flexural plate is not directly exposed to the process pressure, but is in contact with the process via a pressure transmitter. The pressure transmitter can be a large bulk solid or pipe filled with an incompressible fluid, e.g. oil, which is, vis a vis the process, sealed via a pressure sensitive diaphragm.

A general characteristic of the described sensors is a diaphragm, which bends depending on the difference in the pressure on both sides. This bending is converted into an electrical signal via various methods (capacitive or piezoresistive).

Gauge pressure sensors are quite frequently employed in industrial processes, where they are exposed to high temperature changes and to high temperature differences between the process and the surrounding environment. During a sudden cooling, the dew-point, of the air in the space inside the sensor, can be reached, leading to condensation of the air moisture on the cold parts of the sensor. Humid air can end up in the sensor as a particular result of the opening to the surrounding environment, which is necessary to supply the measuring element with the reference pressure supply.

Electromechanical transducers as well as sensor electronics are typically very sensitive to moisture. In order to complete a reliable pressure calculation, the access of moisture condensate into the inside of the gauge pressure sensor must be safeguarded against. According to EP 1070948 A1 there is a gauge pressure sensor, wherein the reference pressure supply tube comprises a segment of enlarged cross-sectional area, wherein there is a hydrophilic unit. This is intended to remove water from moist air, so that only dry air accesses the measurement chamber. However, the disadvantage here is that with a high flow rate of air through the hydrophilic unit, a satisfactory drying of the air is not guaranteed. Such an increased flow rate can especially occur in with a significant drop in temperature, because this leads to a large compression of the air in the reference pressure supply tube.

SUMMARY OF THE INVENTION

An object of the invention is to provide a gauge pressure sensor, which is safeguarded against moist air, even in the event of rapid temperature change.

The object is achieved through features including that the dehumidifying chamber contains a moisture adsorbing material or is primarily composed of a moisture adsorbing material, in that the moisture adsorbing material is at least, in sections, enclosed by a wall, which is composed of a first moisture permeable material, or is at least, in sections, free from a wall, and in that the reference pressure supply tube is, at least in sections, a first or second moisture permeable material or in that the reference pressure supply tube has an aperture so that moist air, in the reference pressure supply tube, is in contact with the dehumidifying chamber.

In an embodiment of the invention, the measuring element comprises a measuring chamber with a diaphragm, whose outer surface is in contact with the medium whose pressure is to be registered, and whose inner surface is exposed to the reference pressure supply. In an alternate embodiment of the invention, the measuring element comprises a flexural plate, whereon pressure sensitive elements or electromechanical transducers are arranged, and a pressure transmitter.

The flexural plate is exposed to the pressure that is to be measured, or to pressure that has a known, functional dependence on the pressure that is to be measured. In other words, the invention concerns/relates to/covers the previously described gauge pressure sensors, from the prior art.

According to an embodiment of the invention, the reference pressure supply tube and the dehumidifying chamber are coordinated so that a limited exchange of air, which is to be dehumidified, occurs. The dehumidifying chamber is, by way of example, a sintered body out of a moisture adsorbing material, which is preferably enclosed by a wall. In accord with an embodiment, the wall is composed of a material that is moisture permeable, in sections permeable, or moisture impermeable. In other embodiments the dehumidifying chamber is partially or completely filled with powder, granulate or gel from a moisture adsorbing material.

A variety of designs is possible for the embodiment of the dehumidifying chamber and reference pressure supply tube. By way of example, the dehumidifying chamber encloses a section of the reference pressure supply tube, wherein the wall of the vented reference pressure supply tube and the contact surface with the dehumidifying agents is composed of a moisture permeable membrane. In another embodiment, the dehumidifying chamber and the reference pressure supply tube are placed next to each other so that they are in contact for a segment, wherein the contact surface is composed of a moisture permeable membrane. In a further embodiment of the invention, the dehumidifying chamber is placed in the housing separate from the reference pressure supply tube, and where the wall of the dehumidifying chamber is at least partially composed of a moisture permeable material, and where the reference pressure supply tube also comprises such a segment, so that moisture can leave said supply tube and enter the dehumidifying chamber. In this last mentioned embodiment, not only is the air from the reference pressure supply tube dehumidified, but also the entire inside of the housing is dried. Thus, the sensor electronics are safeguarded from the accumulation of moisture.

In a first embodiment of the inventive solution, the reference pressure supply tube is positioned with a segment inside the dehumidifying chamber and this segment inside the dehumidifying chamber comprises the first or second moisture permeable material.

In an alternative embodiment, a segment of the reference pressure supply tube is positioned within the dehumidifying chamber and this segment comprises an aperture. Preferably, the dehumidifying chamber in this embodiment comprises a hermetic wall and is only partially filled with moisture adsorbing material, so that an empty space is provided, wherein the air, which is to be dehumidified, enters through the aperture. Through this embodiment, it is guaranteed that no pressure drop takes place within the dehumidifying chamber and that the reference pressure is conducted unaltered into the measuring element. Preferably, the moisture adsorbing material is separated from the empty space by means of a moisture permeable membrane, so that a gradual air exchange occurs. The aperture in the reference pressure supply tube, by way of example, is a complete break in the tube, so that the reference pressure supply tube effectively comprises two parts.

In an advantageous embodiment of the invention, the dehumidifying chamber and the reference pressure supply tube comprise a section of common boundary surface area composed of the moisture adsorbing material and/or the first or second moisture permeable material. The dehumidifying of the air in the reference pressure supply tube only occurs in the section, wherein the reference pressure supply tube and the dehumidifying chamber are in contact. If the common boundary surface area is composed of a moisture permeable material rather than a moisture adsorbing material, then a gradual dehumidification occurs and a rapid saturation of the dehumidifying agent, during times of high volume flow rates, is avoided.

According to a further embodiment, the thickness of the moisture permeable material wall, which is at least partially surrounded by moisture adsorbing material, is selected so that a preselected amount of air is dehumidified. The diffusion rate is thus influenced. The wall, here, can be identical to the wall, or a part of the wall, of the dehumidifying chamber, or in the case that the moisture adsorbing material does not completely fill the dehumidifying chamber it can comprise a separating layer between the moisture adsorbing material and the rest of the volume in the dehumidifying chamber.

In an embodiment of the invention, the dehumidifying chamber is, in the form of a cartridge, installable and/or replaceable in the housing. Either the dehumidifying chamber is itself replaceable, or a second, exchangeable, supplementary dehumidifying chamber is inserted into the housing. This has the advantage that the dehumidifying chamber can be exchanged when the moisture adsorbing material is saturated, and thus, through the replacement of the dehumidifying chamber, the dehumidification capacity can be restored.

According to an advantageous embodiment, the dehumidifying chamber is positioned so that it at least partially surrounds the sensor electronics, arranged inside the housing. By way of example, the dehumidifying chamber is fitted to the housing and contains a recess wherein the sensor electronics are arranged. This ensures the safeguarding of the sensor electronics against moisture, if, for example, moisture ingresses into the housing via a leak. Obviously, the dehumidifying chamber comprises no wall, or a moisture permeable wall, at least in sections adjacent to the sensor electronics.

A further embodiment of the gauge pressure sensor provides that the dehumidifying chamber comprise the moisture adsorbing material as a molded body or in granular form, or that the dehumidifying chamber be a sintered body or a composite body of moisture adsorbing material. A composite body is a two phase solid material, composed of moisture adsorbing material and other materials, esp. polymer.

An advantageous further development of the invention comprises the length of the reference pressure supply tube, which is considerably longer than the length of the housing. In contrast, the dehumidifying chamber, and accordingly the volume of exchanged air, is kept as small as possible. It is thus achieved that the reference pressure supply tube volume is greater than the chamber volume and accordingly the flow rate volume, which is moved in the event of temperature changes. In other words, the volume that is delineated by the outward leading part of the reference pressure supply tube is greater than the volume of the air filled compartment in the dehumidifying/dry chamber. If this requirement is met, the temperature dependent changes in volume do not lead to a large ingress of humid air into the dehumidifying/dry chamber, which would lead to a rapid saturation of the moisture adsorbing material.

A preferable embodiment provides that the reference pressure supply tube is arranged in a spiral form, in at least a segment. A long input capillary, which is stable and space effective, can thus be realized.

According to a further embodiment of the invention it is proposed that the moisture adsorbing material in the dehumidifying chamber be Zeolite or Silica gel. An advantage offered by zeolite or silica gel is reusability, because the adsorbed moisture can mostly be extracted by heating them. If the dehumidifying chamber is conceived as a replaceable cartridge, the dehumidifying chamber is reusable.

In an embodiment, the first and second moisture permeable materials are selected from the group of polymer materials. In particular, the first and/or second moisture permeable material is silicone, silicone rubber, PVC, PTFE, polyamide or polyimide.

According to a further embodiment, the moisture adsorbing material in the dehumidifying chamber is chosen so that the moisture adsorbing material adsorbs $O_3$ (ozone), $NH_3$ (Ammonia), $H_2S$ (hydrogen sulfide) and/or HF (hydrogen fluoride), in addition to moisture. If adsorbing these substances is desirable, then zeolite is a suitable moisture adsorbing material because of its porous structure. The size of the mentioned interstitial volumes in a sintered body of zeolite can be controlled during the production process. If zeolite is subjected to a sintering process, then pores of an intended size are inducible in the resultant sintered molded body and sintered granulate, respectively, by means of an admixture of other substances in the base sintering power. These substances combust or evaporate completely, leaving behind corresponding interstitial spaces, wherein the adsorbed substances can easily ingress.

In a further embodiment of the invention, in the case where a gauge pressure sensor includes a number of housings, at least one dehumidifying chamber is inserted into each housing. If, by way of example, an inner housing is inserted into the housing, or if the housing is connected to other housings, then these also comprise a suitably arranged dehumidifying chamber. In this way, comprehensive protection of all components can be guaranteed.

A further embodiment provides that the dehumidifying chamber comprises at least two electrodes and that an electrical unit is dedicated to the dehumidifying chamber, wherein the electrodes are supplied with alternating current, whereby an electrical circuit parameter of the moisture adsorbing material is determined, so that, by means of the determined electrical circuit parameter, the electrical unit can register the degree of saturation of the moisture adsorbing material. Here, the electrical unit is understood to be the sensor electronics or a separate electrical unit. By monitoring the degree of saturation, it is possible to replace the dehumidifying chamber with a new one before the point at which the moisture adsorbing material is completely saturated and the safeguarding of the electronics would no longer be guaranteed.

The electrodes are here arranged so that they comprise a capacitor. This serves to determine an electrical circuit parameter, which is dependent on, and has a clearly defined relationship to, the amount of moisture in the moisture adsorbing material. By these means, it is possible to make an assertion as to the amount of substance already adsorbed. Moreover, when the maximum saturation of the moisture adsorbing material is known, the remaining adsorption capacity for water is thereby determinable.

Preferably, the capacitance and/or dissipative factor, tan δ, are determined as electrical circuit parameters. The latter refers to the relationship between the resistive and reactive power and is independent of the geometry of the electrodes and of the body, wherein or whereon they are arranged. It can be calculated from the phase difference between the current and voltage of the capacitor, i.e. the electrodes supplied with alternating current, in the following way: $\tan \delta = \tan(\pi/2 - \phi)$. The saturation of the moisture adsorbing material is directly determinable from dissipative factor.

Preferably, the electrodes are with alternating current in the frequency range between 1 and 100 kHz. This range is especially advantageous for zeolite because the dissipative factor of saturated zeolite in nearly independent of the measurement frequency in this frequency range, and a stable measurement is thus guaranteed.

BRIEF DESCRIPTION OF THE DRAWINGS

The invention will now be explained in great detail with the help of the following drawings.

FIG. 4 is a sectional close-up of a pressure sensor with a dehumidification system in accordance with the representation of an illustrative embodiment in FIG. 3a;

DETAILED DISCUSSION IN CONJUNCTION WITH THE DRAWINGS

In each of the FIGS. 1-3a and 3b a schematic representation of a housing 12 with an enclosed dehumidifying chamber and a reference pressure supply tube 3 is shown. The figures here show three preferred embodiments of the dehumidifying chamber 4 and the reference pressure supply tube 3. In FIG. 4, the detailed construction of an inventive gauge pressure sensor 1 is elucidated with the help of the illustrative embodiment shown in FIG. 3. The illustrative embodiments are described based on the example of a capacitive measuring gauge pressure sensor. Self-evidently, the embodiments apply equally well to alternative embodiments of gauge pressure sensors, such as, by way of example, those with pressure agents.

Figure 1:
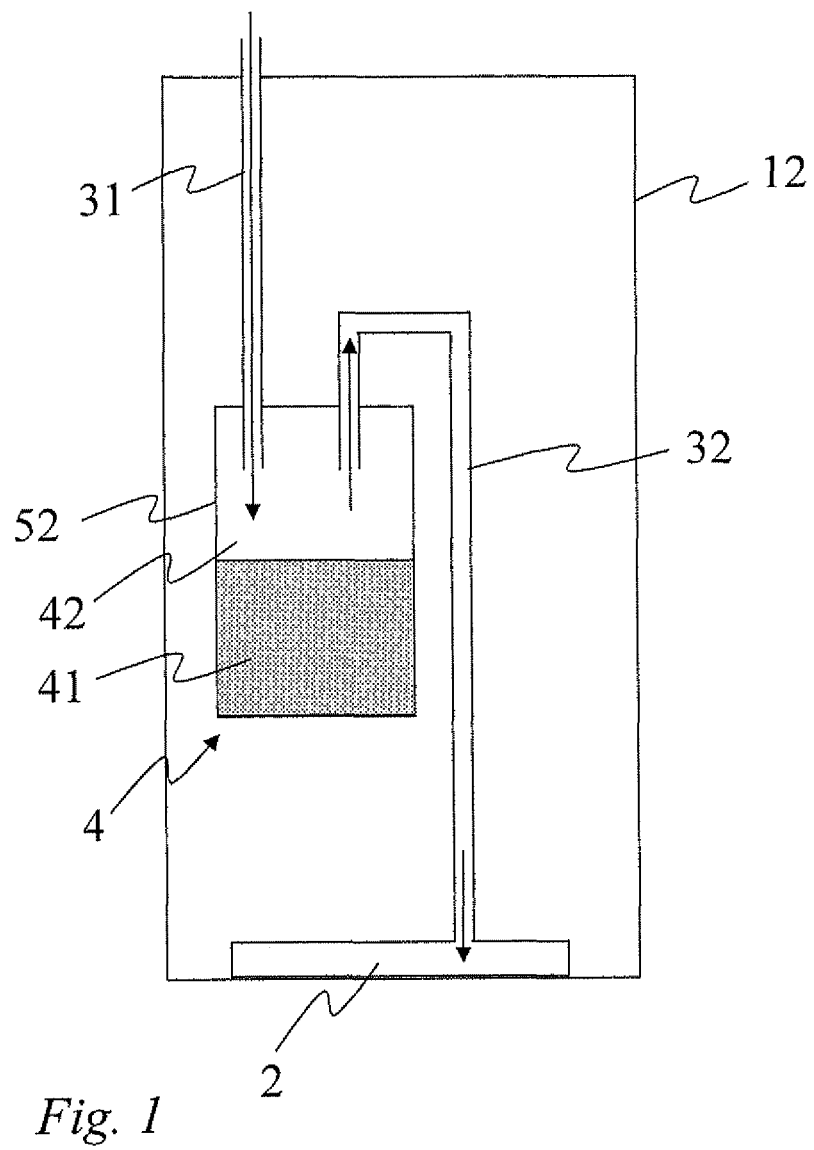
FIG. 1 is a schematic representation of a first illustrative embodiment of a dehumidifying system.

In FIG. 1 is a schematic representation of the housing 12 of a gauge pressure sensor 1 and a dehumidifying system comprising a dehumidifying chamber and a reference pressure supply tube 31,32, wherein the dehumidifying chamber 4 is completely enclosed by a moisture impermeable wall 52, which is breached by the reference pressure supply tube 31,32 two times. The reference pressure supply tube 31,32 is interrupted inside the dehumidifying chamber 4, i.e. a first capillary 31 leads into the dehumidifying chamber and a second capillary 32 leads out of it. The direction of flow of the air, which is lead through the first capillary 31 into the dehumidifying chamber 4, is represented by both arrows. The dehumidifying chamber 4 is only partially filled with a moisture adsorbing material 41, so that there is a hollow space 42, which is in contact with the moisture adsorbing material 41. In an embodiment, the moisture adsorbing material 41 is separated from the empty space 42, by means of a moisture permeable membrane. The moisture adsorbing material 41 is preferably zeolite and is provided in the form of granulate, powder or a sintered body. As a result of the interruption in the reference pressure tube 3, outside air, that enters the reference pressure supply tube 3, reaches in the hollow space 42, where it is circulated and dehumidified for a certain amount of time, before it exits the dehumidifying chamber 4 via the second capillary 32 and is conducted to the measurement chamber 2.

The advancement of humid air, and the precipitation of moisture, into the region of the measurement chamber 2, is avoided by these means.

Figure 2:
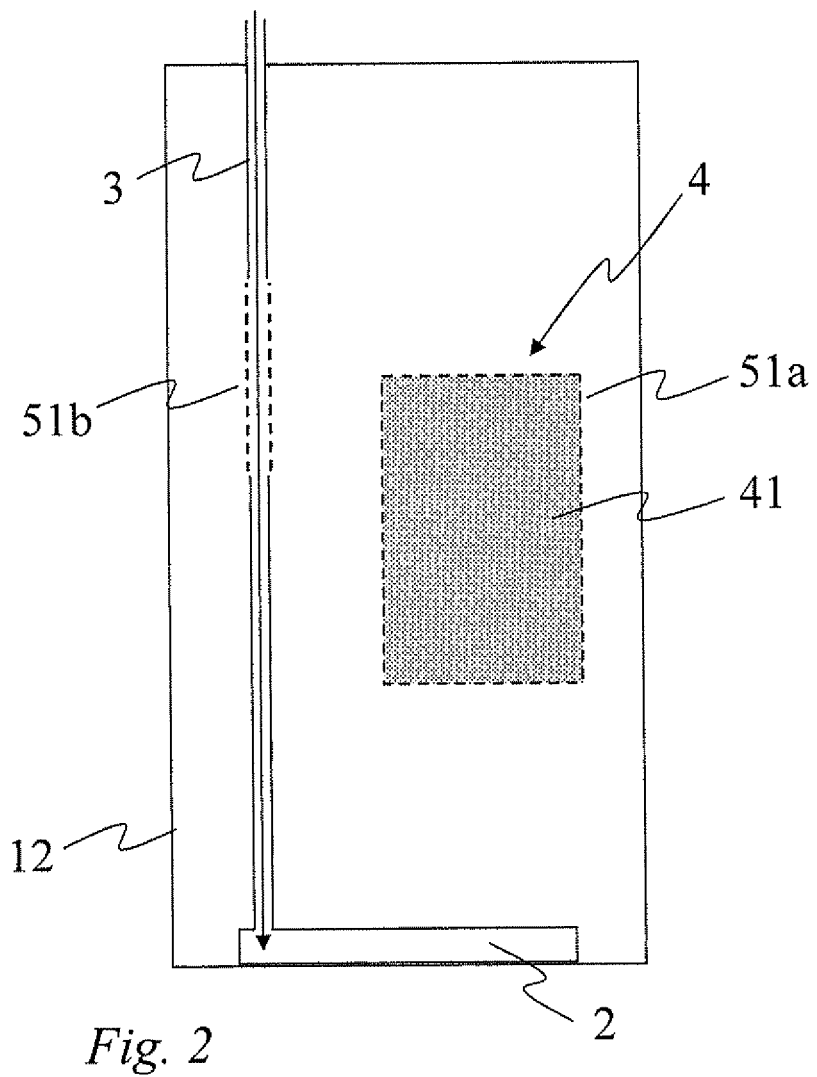
FIG. 2 is a schematic representation of a second illustrative embodiment of a dehumidifying system.

FIG. 2 shows an alternative embodiment of the dehumidifying system comprising a dehumidifying chamber 4 and a reference pressure supply tube 3, wherein the entire internal space of the housing 12 is safeguarded against the liquefaction of moisture. The dehumidifying chamber 4 is, in this illustrative example, either encompassed by a moisture permeable wall 51a, wherein, for example, the wall encloses granulate or gel moisture adsorbing material 41, or wherein the dehumidifying chamber 4 does not comprise a wall. In the latter case, the dehumidifying chamber 4, by way of example, is comprises a sintered molded body out of moisture adsorbing material 41. Further embodiments are possible, wherein the moisture adsorbing material is partially enclosed by a moisture permeable material 51a and partially enclosed by a moisture impermeable material 52. The moisture intake of the moisture adsorbing material is hereby decreased and a premature saturation is avoided.

The reference pressure supply tube 3, independent of the dehumidifying chamber 4, leads through the housing 12 to the measuring chamber 2 and partially comprises, in the section which runs through the housing 12, a section of moisture permeable material. Alternatively, the entire reference pressure supply tube 3, in the section located within the housing 12, is manufactured from a moisture permeable material. The moisture permeable material is, by way of example, silicone. By theses means, the air in the reference pressure supply tube 3 is exchanged with the air in the housing 12 and is dehumidified by the dehumidifying chamber 4. In order to avoid a rapid saturation of the moisture adsorbing material 41 in the dehumidifying chamber 4, the embodiment of the housing 12 of the pressure sensor is waterproof and hermetic so that only the air conducted through the reference pressure supply tube 3 reaches the housing 12. In contrast to known variants of the prior art, wherein the air from the reference pressure supply tube 3 is led to a completely filled dehumidifying chamber 4 comprising a sealed wall, and is led by means of a second capillary 32 to the measurement chamber 2 from the dehumidifying chamber 4, in this illustrative embodiment, it is guaranteed that only dried air reaches the measurement chamber 2, even in the case of large flow volumes.

Figure 3A:
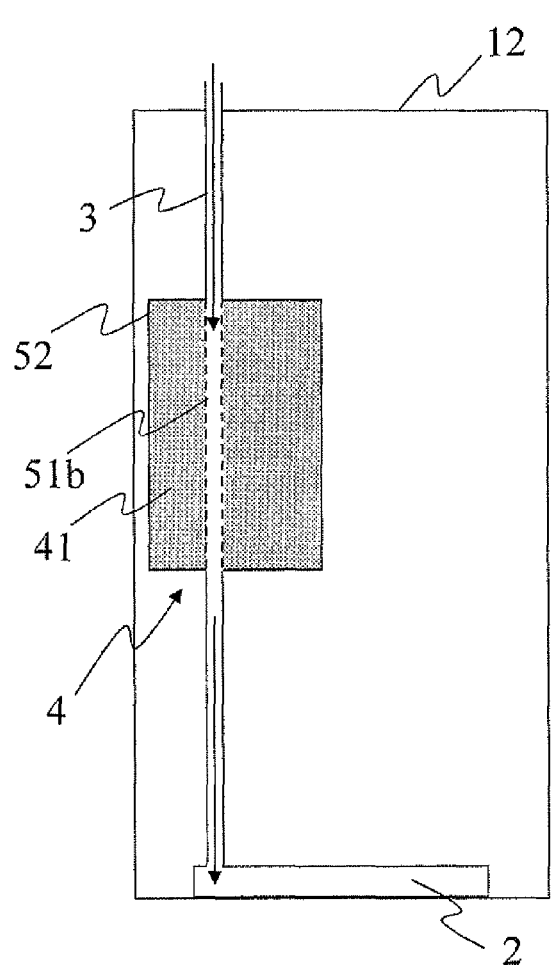
FIGS. 3a and 3b are schematic representations of a third illustrative embodiment of a dehumidifying system.
Figure 4:
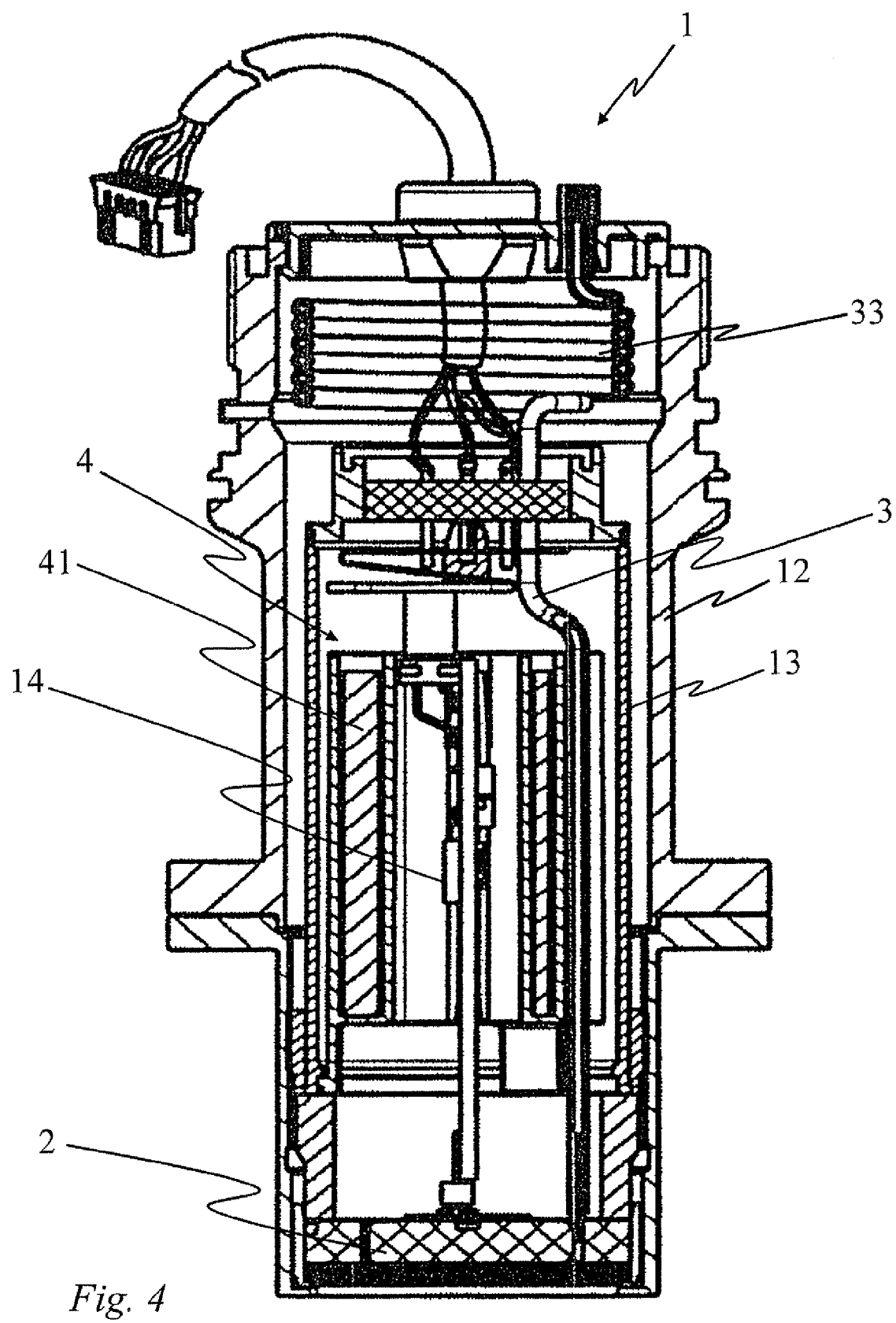

FIG. 3a shows and especially advantageous embodiment of the dehumidifying system, wherein the reference pressure supply tube 3 leads through the dehumidifying chamber 4. The dehumidifying chamber 4 comprises a moisture impermeable wall 52 and a moisture adsorbing material 41, which is separated from the surrounding environment by means of the wall. The segment of the reference pressure supply tube 3, which is inside the dehumidifying chamber 4, comprises, at least partially, a moisture permeable material, so that moist air is dehumidified before it exits the dehumidifying chamber 4 and is conducted into the measuring chamber 2. By way of example, the reference pressure supply tube 3 comprises two capillaries composed of hermetic and waterproof materials, e.g. manufactured from glass, which are connected by a connecting piece composed of a moisture permeable material, e.g. silicone. This connecting piece is completely enclosed by the dehumidifying chamber 4 so that no moisture reaches the inner space of the housing 12.

Figure 3B:
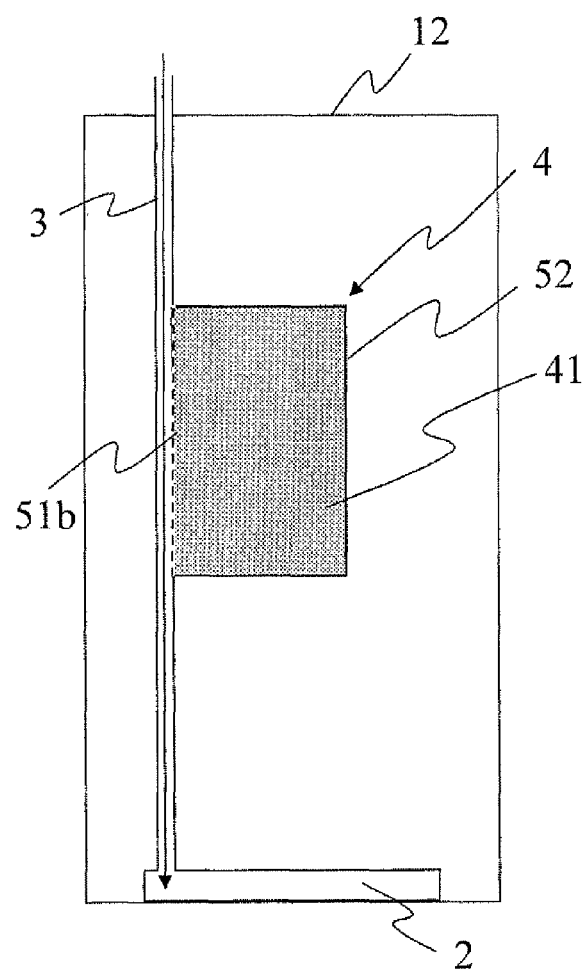

In FIG. 3b is a representation of a variant of the illustrative example found in FIG. 3a wherein the reference pressure supply tube 3 leads past the dehumidifying chamber 4 such that they are in contact along a boundary area. This contact boundary area between the dehumidifying chamber 4 and the reference pressure supply tube 3 comprises moisture permeable material, so that the air in reference pressure supply tube 3, in the segment alongside this boundary area, is dehumidified.

FIG. 4 represents the detailed construction of an inventive gauge pressure sensor. The end of the measurement chamber 2 comprises a membrane, which is exposed to the process, in the terminal region of the pipe shaped housing 12. Above the measurement chamber 2, an inner housing 13 is employed inside the housing 12, which houses the sensor electronics 14 as well as the dehumidifying chamber 4. The reference pressure supply tube 3 comprises a long, coiled entrance capillary 33 and an essentially straight segment inside the inner housing 13. The spiral shaped arrangement of the entrance capillary 33, permits the entrance capillary 33 to possess a long length, while still, despite its long length, being space effective. It is self-evident that, besides the spiral shaped arrangement, there are many other conceivable embodiments of the entrance capillary 33 inside and outside of the housing 12. The great length of the entrance capillary 33 serves as a buffer in the event of large pressure changes, in order to prevent air, which has not yet been dehumidified, from reaching the measurement chamber 2. Preferably, such a long entrance capillary 33 can be attached to all of the previously described and depicted reference pressure supply tubes 3 in order to increase the efficiency of the respective dehumidifying systems. This embodiment can be dispensed with if the dehumidifying chamber 4 is replaceable and it does not matter how rapidly it is saturated.

The dehumidifying chamber 4 in this illustrative example is a cylindrical shaped and encompasses the sensor electronics 14. The shape of the dehumidifying chamber 4 is however not restricted to this cylindrical example. Furthermore, the dehumidifying chamber 4 is filled with a moisture adsorbing material 41. Alternatively, the dehumidifying chamber 4 is a sintered body composed of a moisture adsorbing material 41, wherein the outer surface is enclosed by a moisture impermeable wall 52. This serves to prevent the moisture adsorbing material 41 from readily gathering moisture from the surrounding during the assembly of the sensor device. The inner wall, which faces the sensor electronics 14, is moisture permeable, so that the compartment around sensor electronics 14 is dehumidified.

The reference pressure supply tube 3 leads through the dehumidifying chamber 4, wherein the segment of the reference pressure supply tube 3, which is located inside the dehumidifying chamber 4, comprises a moisture permeable wall 51b compose of, by way of example, silicone, PVC or PTFE. For the rest of its length, the reference pressure supply tube 3 is composed of a waterproof and hermetic material. Thus, air that enters the reference pressure supply tube 3, from the outside of the gauge pressure sensor 1, cannot access the housing 12, whereby condensation of moisture is avoided. Inside the dehumidifying chamber 4, the water is removed from moist air and stored in the moisture absorbing material 41, so that the air, which ends up in the measurement chamber 2, is dry. Because the access of moist air into the measurement chamber 2 is hereby avoided, this embodiment makes possible a reliable and precise determination of pressure.

In this embodiment, the volume that is enclosed in the reference pressure supply tube 3 between the entrance and the beginning of the dehumidifying chamber is greater than the volume of the region of the dehumidifying chamber to the point of the measurement chamber. Only a low volume is conducted through the dehumidifying chamber 4 via the reference pressure supply tube 3, so that in the event of an intense compression of air induced by a severe temperature change, the dehumidifying chamber 4 does not suddenly imbibe a large volume of humid air, which would lead to a clear depreciation in the duration of the operating life of the dehumidifying chamber 4, because this is determined by the duration of time it takes to reach a point of complete saturation of the moisture adsorbing material. The greater the exchange volume of the moisture adsorbing material 41, the more quickly it will be saturated.

In addition to a low volume, the dehumidifying chamber 4 reduces its exchange volume by means of a wall or membrane, which separates the reference pressure supply tube 3 from the moisture adsorbing material 41. By optimizing the permeability and thereby the diffusion rate of water molecules through the moisture permeable wall 51b, the dehumidification rate for a determined volume of air can be adjusted. By building in an optimal dehumidification rate, it is firstly guaranteed that a determined volume of air is reliably dehumidified before it reaches the measurement chamber 2, and secondly, the operational life of the dehumidifying chamber 4 and moisture adsorbing material is maximized.

The moisture adsorbing material 41 is not restricted to the adsorption of moisture. Depending on the application of the pressure sensor 1, the moisture adsorbing material is selected or manufactured so that in addition to water, it can adsorb other molecules such as ozone, ammonia, hydrogen sulfide and hydrogen fluoride. Which molecules are adsorbed is, in this case, dependent, first and foremost, on the size of the interstitial space in the molecular sieve, which is a means of classifying moisture adsorbing material 41. If the moisture adsorbing material 41 under consideration is Zeolite, especially, then interstitial spaces of a size that is suitable to the respective molecules, can be manufactured. Typically, granulate or a sintered body is synthesized out powdered zeolite in a high temperature process (ca. 600-1000° C.), because the powder is a health hazard. Another option is that a composite, i.e. biphasic solid material, be manufactured from zeolite or silicone gel and a polymer. The size of the interstitial spacing and pores, respectively, can be influenced by means of an admixture of other substances, which during the sintering process dissolve out of the material or combust, respectively. One such admixture substance is, by way of example, ammonium oxalate. The rate of adsorption of the molecular sieve can be adjusted by targeting a specific level of porosity in the zeolite ceramic.

The moisture adsorbing material 41 of the dehumidifying chamber 4 is not employable for an unlimited amount of time, because after a certain amount of time it becomes saturated. Therefore, the dehumidifying chamber 4 is advantageously embodied as a replaceable module. Alternatively or additionally, a second dehumidifying chamber 4 is insertable into the housing 12, wherein the reference pressure supply tube 3 is accordingly fitted to the second dehumidifying chamber 4, so that dehumidification also occurs there, and also second dehumidifying chamber 4 is preferably outside of the inner housing 13, which is seen as advantageous because replacing it can be achieved without a coincident replacement of the sensor electronics.

Not pictured in FIG. 4 is a measuring transducer, which principally comprises further electronic components, and data links for communication between the gauge pressure sensor and a superordinate unit, e.g. a provided master display, which preferably utilizes an optical display for the visualization of, for example, the device status or measurement data. In an advantageous further development of the invention, a dehumidifying chamber 4 is placed in the measuring transducer as well. In this way, the gauge pressure sensor 1 ideally comprises three dehumidifying chambers 4, whereby the measurement transducer, the inner housing 13, and the housing 12 comprise one each. A pressure sensor comprising a greater number of housings comprises a greater number of dehumidifying chambers 4, so that components of each housing are safeguarded against condensing moisture.

Figure 5A:
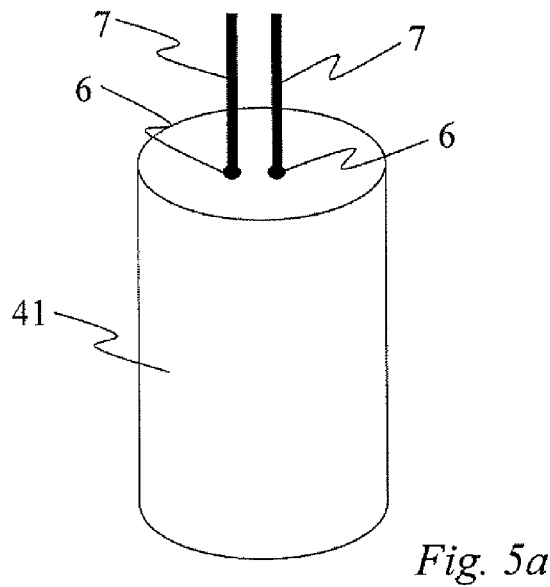
FIGS. 5a-5c show an assortment of electrode arrangements for determining the degree of saturation of a molded embodiment of a dehumidifying chamber.
Figure 5B:
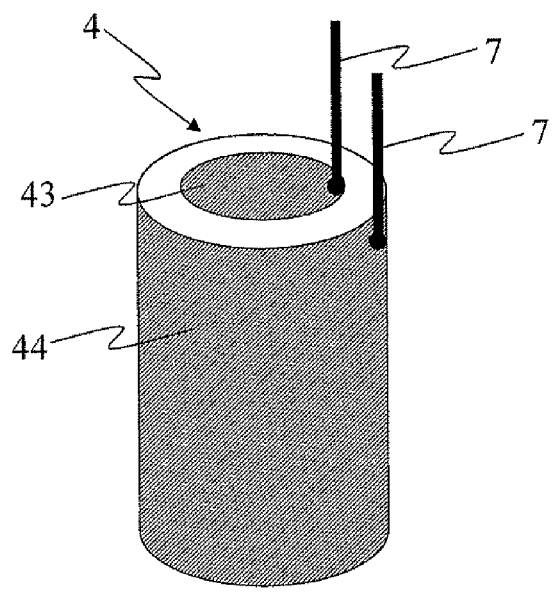
Figure 5C:
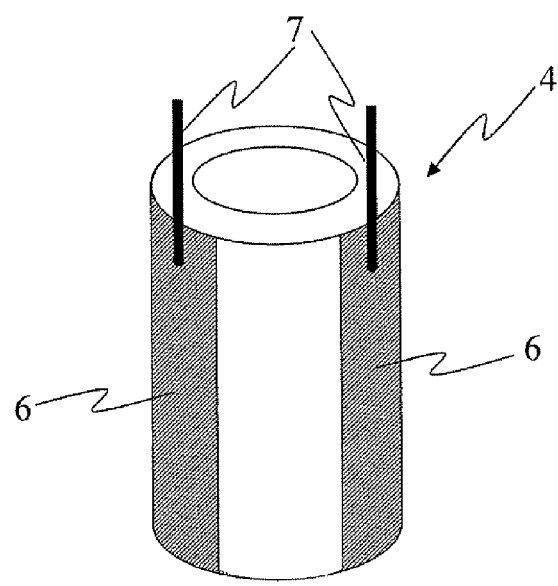

FIGS. 5a-c show examples of varying arrangements of electrodes 6, by means of which the degree of saturation of the dehumidifying chamber 4 is monitored either constantly or by means of measurements repeated in short intervals. The preferred embodiments represented in FIGS. 5a-c can also be, respectively, composite parts of a larger mold, which has a more complex structure.

Preferably, the electrodes 6 are connected to the sensor electronics 14 by means of electric conduits 7, which supply the electrodes 6 with alternating current in order to determine an electrical circuit parameter, such as for example, the dissipative factor, $\tan \delta$. Alternatively, the electrodes 6 are dedicated to a separate electronic unit. The degree of saturation of the moisture adsorbing material 41 of the dehumidifying chamber 4 is ascertainable from the electrical circuit parameter. Preferably, the degree of saturation is regularly registered and an alarm signal is triggered when a certain degree of saturation, for example 90%, is reached. This alarm signal signals a master display, for example, that a replacement of the moisture adsorbing material 41 is required. If the appropriate replacement is achieved, then the further safeguarding of the element that needs safeguarding, is ensured, as is a seamless and reliable performance by the process device. Adsorbed water can be removed from zeolite by heating it, so that such dehumidifying cartridges are reusable. The dehumidifying chamber 4 makes possible, in addition to the adsorption of targeted substances, status diagnostics, and by these means, reports on the duration of the remaining operational lifetime of the adsorber. This is very important in the context of "predictive maintenance".

FIG. 5a shows an embodiment, wherein the electrodes 6 are inserted into the moisture adsorbing material 41 in the form of, by way of example, metallized wells. The electrodes 6 can be supplied with an electric signal via the electric conduits 7, to which they are connected.

FIGS. 5b and 5c reveal advantageous embodiments of the electrodes 6 with corresponding electrical contacts, wherein the electrodes 6 are each superimposed on the outer surface of the dehumidifying chamber 4, represented as a hollow cylinder.

In FIG. 5b, the inner 43 and outer 44 surfaces of the hollow cylinder are provided with an electrically conductive surface coating, while the ring shaped top side and bottom side of the cylinder are both free of this coating so that the outer surface 44 is electrically isolated from the inner surface 43. The surface coating preferably involves silver, gold, platinum or nickel. All metals that are good conductors are suitable. The inner 43 and outer 44 surfaces are each contacted via an electric conduit 7, such as a wire, for example. By way of example, a coaxial cable is stripped of its adaptor on an end, the inner lead is linked to the coated inner surface 43 and the conducting shield is linked to the coated outer surface 44.

In the variant depicted/represented in FIG. 5c, two electrodes 6 in the form of band-shaped coatings are superimposed on the outside surface 44 of the dehumidifying chamber 4 and contacted via electrical conduits. Here, the position of the two bands relative to each other is adjustable at will. Albeit the bands in this embodiment comprise the same length as the cylinder, this is not required in every case; bands that have smaller dimensions are equally suitable.

Figure 6:
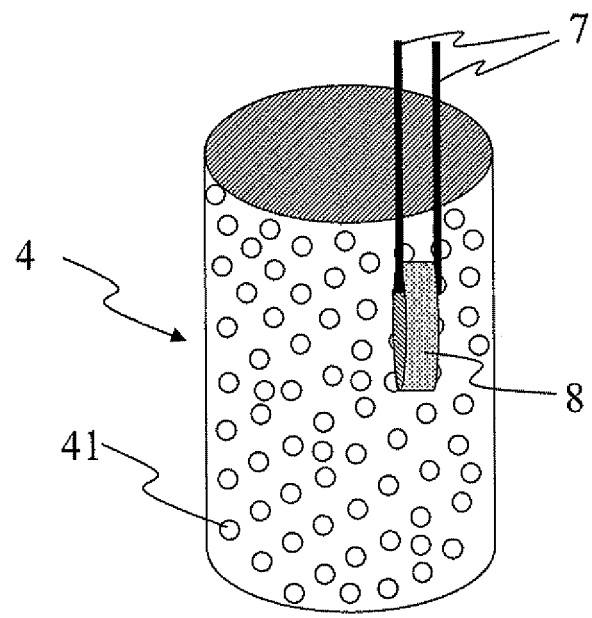
FIG. 6 shows schematically a granulate filled, dehumidifying chamber with an inserted molded body.

FIG. 6 shows a dehumidifying chamber 4, wherein the embodiment of the moisture adsorbing material 41 is granulate, e.g. in the form of sintered zeolite pellets. The wall of the dehumidifying chamber 4 is preferably permeable to the substance, which is to be adsorbed. In order to determine the degree of saturation of the granulate, a molded body 8 of the same moisture adsorbing material 41 is inserted into the dehumidifying chamber 4, which is provided with electrodes 6 and can be linked to an electronic unit.

Figure 6A:
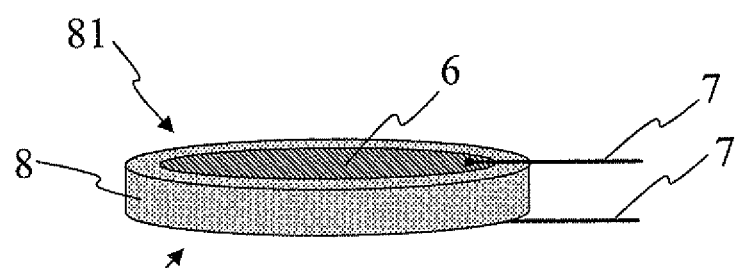
FIGS. 6a-6b show schematic embodiments of the molded body in FIG. 6.
Figure 6B:
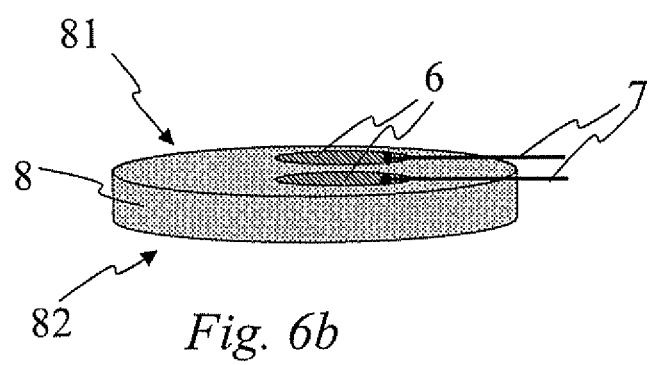

FIGS. 6a and 6b show preferable embodiments of a disk shaped molded body 8 for insertion into granulate or powder. Self evidently, the disk shape is not restricted to the application in granulate.

In FIG. 6a a ceramic molded body 8 comprising a moisture adsorbing material 41 is pictured, wherein the circle shaped top side 81 and bottom side 82 are both provided with a coating, which constitute the electrodes 6 and are contacted via electrical conduits 7. The coating is laminar plating. Other embodiments can be thought of, wherein the coating has a ring shaped form.

An alternative electrode arrangement is shown in FIG. 6b. There, the circle shaped top side 81 of the molded body 8 comprises a coating in the shape of two strips and the bottom side 82 is free of coating. Accordingly, the contacting electrical conduits 7 are arranged on only one side of the molded body 8.

The invention claimed is:

1. A gauge pressure sensor for determining the pressure of a medium relative to atmospheric pressure, comprising:
a housing;
a measuring element, which is positioned in said housing, wherein an outwards facing side of said measuring element is in contact with the medium and is exposed to the pressure of the medium;
a tube for reference pressure, which conducts ambient air at atmospheric pressure to an inner side of said measuring element;
an analysis unit, which determines the pressure of the medium from a magnitude determined by means of said measuring element; and
at least one dehumidifying chamber, positioned in said housing, for the collection of air moisture, wherein:
said dehumidifying chamber contains a moisture adsorbing material or is primarily composed of a moisture adsorbing material, in that said moisture adsorbing material is at least, in sections, enclosed by a wall, which is composed of a first moisture permeable material, or is at least, in sections, free from a wall; and
in that said reference pressure supply tube is, at least in sections, a first or second moisture permeable material or in that the reference pressure tube has an aperture so that moist air, in said reference pressure supply tube, is in contact with said dehumidifying chamber.

2. The device as claimed in 1, wherein:
said reference pressure supply tube is positioned with a segment inside said dehumidifying chamber and this segment inside said dehumidifying chamber comprises said first or second moisture permeable material.

3. The device as claimed in claim 1, wherein:
a segment of said reference pressure supply tube is positioned within said dehumidifying chamber and this segment comprises an aperture.

4. The device as claimed in 1, wherein:
said dehumidifying chamber and said reference pressure supply tube comprise a section of common boundary surface area composed of the moisture adsorbing material and/or said first or second moisture permeable material.

5. The device as claimed in claim 1, wherein:
the thickness of said moisture permeable material wall, which is at least partially surrounded by moisture adsorbing material, is selected so that a preselected amount of air is dehumidified.

6. The device as claimed in claim 1, wherein:
said dehumidifying chamber is, in the form of a cartridge, installable and/or replaceable in said housing.

7. The device as claimed in claim 1, wherein:
said dehumidifying chamber is positioned so that it at least partially surrounds said sensor electronics, arranged inside said housing.

8. The device as claimed in claim 1, wherein:
said dehumidifying chamber comprises said moisture adsorbing material as a molded body or in granular form, or that said dehumidifying chamber be a sintered body or a composite body of said moisture adsorbing material.

9. The device as claimed in claim 1, wherein:
the length of said reference pressure supply tube, which is considerably longer than the length of said housing.

10. The device as claimed in 9, wherein:
said reference pressure supply tube is arranged in a spiral form, in at least a segment.

11. The device as claimed in claim 1, wherein:
said moisture adsorbing material in said dehumidifying chamber is Zeolite or Silica gel.

12. The device as claimed in claim 1, wherein:
said first and second moisture permeable materials are selected from the group of polymer materials.

13. The device as claimed in claim 1, wherein:
said moisture adsorbing material in said dehumidifying chamber adsorbs $O_3$ (ozone), $NH_3$ (Ammonia), $H_2S$ (hydrogen sulfide) and/or HF (hydrogen fluoride), in addition to moisture.

14. The device as claimed in claim 1, wherein:
in the case where a gauge pressure sensor includes a number of housings, a dehumidifying chamber is inserted into every housing.

15. The device as claimed in claim 1, wherein:
said dehumidifying chamber comprises at least two electrodes; and
that an electrical unit is dedicated to said dehumidifying chamber, wherein said electrodes are supplied with alternating current, whereby an electrical circuit parameter of said moisture adsorbing material is determined, so that, by means of the determined electrical circuit parameter, the electrical unit can register the degree of saturation of said moisture adsorbing material.

* * * * *